United States Patent
Oh et al.

(10) Patent No.: US 8,174,386 B2
(45) Date of Patent: May 8, 2012

(54) RFID READER CONTROLLING DEVICE, INTERLOCKING METHOD FOR RFID READER, AND RFID READER CONTROLLING METHOD

(75) Inventors: Se Won Oh, Daejeon (KR); Hee-Sook Mo, Daejeon (KR); Jee Sook Eun, Daejeon (KR); Jae-Gak Hwang, Daejeon (KR); Cheol Sig Pyo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 452 days.

(21) Appl. No.: 12/511,953

(22) Filed: Jul. 29, 2009

(65) Prior Publication Data

US 2010/0134289 A1    Jun. 3, 2010

(30) Foreign Application Priority Data

Nov. 28, 2008  (KR) .................. 10-2008-0119860
Feb. 25, 2009  (KR) .................. 10-2009-0015912

(51) Int. Cl.
G08B 13/14    (2006.01)
(52) U.S. Cl. ................ 340/572.1; 340/572.4; 340/12.51
(58) Field of Classification Search .............. 340/572.1, 340/572.4, 10.2, 10.3, 12.51; 455/41.2
See application file for complete search history.

(56) References Cited

U.S. PATENT DOCUMENTS

| | | | | |
|---|---|---|---|---|
| 7,267,275 | B2 * | 9/2007 | Cox et al. | 340/572.1 |
| 7,496,486 | B1 * | 2/2009 | Tracey et al. | 340/572.4 |
| 7,692,532 | B2 * | 4/2010 | Fischer et al. | 340/10.2 |
| 2008/0042807 | A1 | 2/2008 | Park et al. | |
| 2008/0316019 | A1 | 12/2008 | Ryoo et al. | |

FOREIGN PATENT DOCUMENTS

| | | |
|---|---|---|
| JP | 2008524742 A | 7/2008 |
| KR | 10-2006-0070188 A | 6/2006 |
| KR | 10-2007-0115130 A | 12/2007 |
| KR | 10-2008-0012850 A | 2/2008 |
| WO | 2007/012909 A1 | 2/2007 |

* cited by examiner

*Primary Examiner* — John A Tweel, Jr.
(74) *Attorney, Agent, or Firm* — Kile Park Goekjian Reed & McManus PLLC

(57) ABSTRACT

An RFID reader controlling device based on a plurality of RFID reader protocols receives control instructions for controlling RFID readers from application devices providing services, and confirms RFID reader protocol types corresponding to control instructions to confirm whether communication channels corresponding to RFID reader protocols are generated. Further, the RFID reader controlling device transmits the control instructions to the RFID readers through the communication channels and transmits the control results of the RFID readers corresponding to the control instructions.

10 Claims, 4 Drawing Sheets

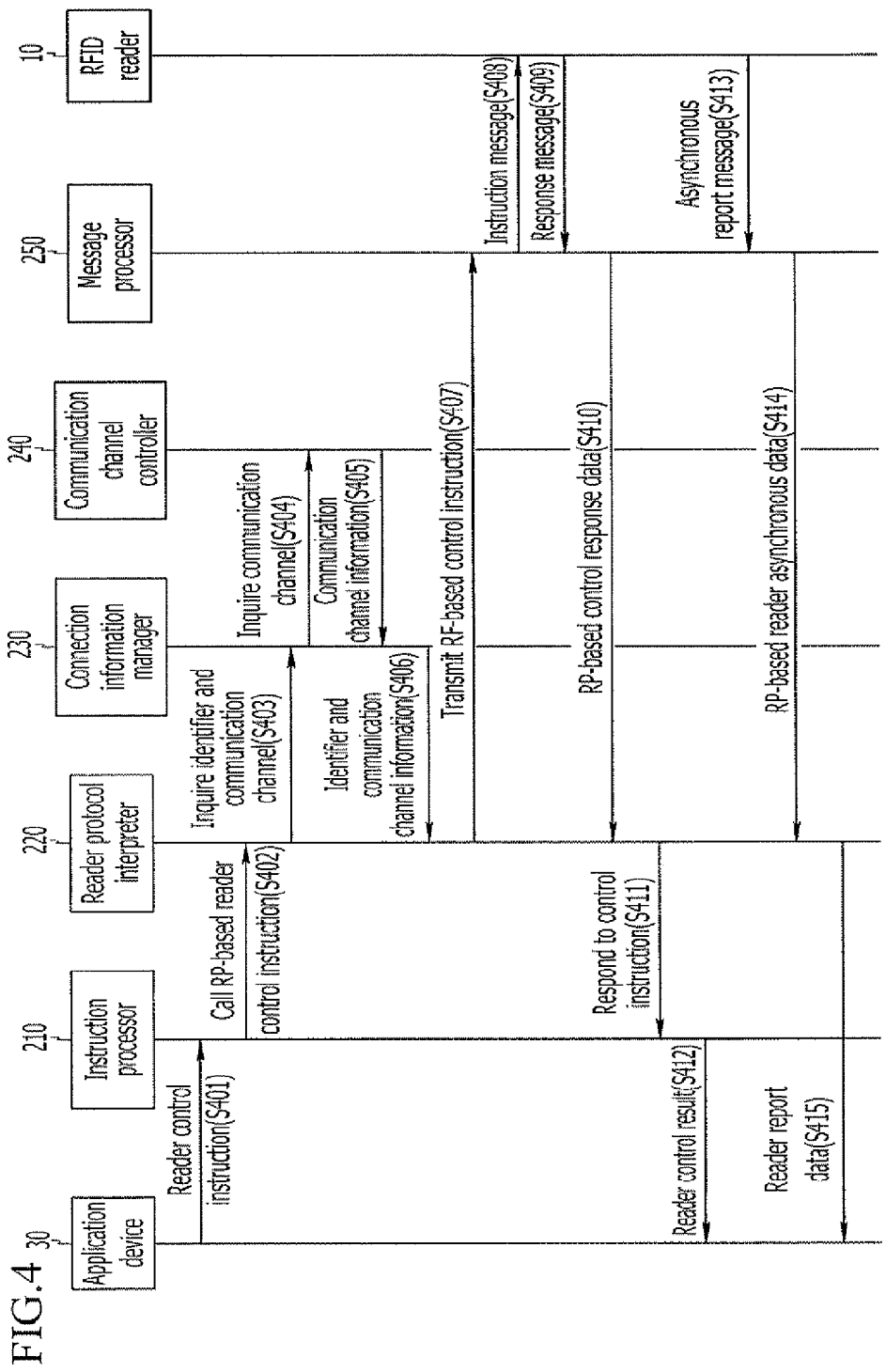

RFID READER CONTROLLING DEVICE, INTERLOCKING METHOD FOR RFID READER, AND RFID READER CONTROLLING METHOD

CROSS-REFERENCE TO RELATED APPLICATION

This application claims priority to and the benefit of Korean Patent Application Nos. 10-2008-0119860 and 10-2009-0015912 filed in the Korean Intellectual Property Office on Nov. 28, 2008 and Feb. 25, 2009, the entire contents of which are incorporated herein by reference.

BACKGROUND OF THE INVENTION (a) Field of the Invention

The present invention relates to a radio frequency identification (hereinafter referred to as "RFID") reader controlling device, an interlocking method for an RFID reader, and an RFID reader controlling method.

In particular, the present invention relates to an RFID reader controlling device that controls by simultaneously using a plurality of RFID reader protocols, an interlocking method for an RFID reader, and an RFID reader controlling method.

(b) Description of the Related Art

An RFID reader controlling method is used to control a specific RFID reader so as to identify RFID tags existing within a recognition range of the corresponding RFID reader and to read and change the identified data.

At this time, the control of the RFID reader can be performed only by the specific RFID reader protocol supported by the RFID reader.

The RFID reader protocol defines instructions, message formats, and communication schemes that are provided by the RFID reader.

Currently, international standards and industrial standards for the REID reader protocols includes ISO/IEC 15961 (hereinafter referred to as "ISO15961"), EPCglobal Reader Protocol (hereinafter referred to as "RP"), EPCglobal Reader Management (hereinafter referred to as "RM"), EPCglobal Low Level Reader Protocol (hereinafter referred to as "LLRP"), and the like.

The RFID readers support only the proprietary RFID reader protocols of to RFID reader manufacturers or observe the RFID reader protocols according to the specific standards among the above standards.

Since the RFID reader has constraints in terms of recognition range, installation position, etc., in order for the plurality of RFID readers to receive services from one application, there is a need to perform consistent data collection and change work by interlocking the plurality of RFID readers.

At this time, when the plurality of RFID readers do not perform the same RFID reader protocols, the communication connection and message processes should be performed separately for each RFID reader protocol.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an RFID reader controlling device according to RFID reader protocols provided by corresponding RFID readers for RFID readers supporting a plurality of RFID reader protocols, an interlocking method for an RFID reader, and an RFID reader controlling method.

Further, the present invention has been made in an effort to provide an RFID reader controlling device that is capable of independently managing each communication channel for a plurality of RFID reader protocols while unifying control paths for RFID readers, an interlocking method for an RFID reader, and an RFID reader controlling method, in an environment in which the plurality of RFID reader protocols are used in one RFID reader or an environment in which each of the plurality of RFID readers is driven according to different RFID reader protocols.

In order to achieve the above objects, an exemplary embodiment of the present invention provides an RFID reader controlling device controlling RFID readers based on a plurality of RFID (Radio Frequency Identification) reader protocols to provide services provided by each application device to RFID readers, including: an instruction processor that performs instructions according to setting messages and control messages to interlock with the RFID readers from the application devices providing the services; an interpreter that converts the setting messages and the control messages based on the RFID reader protocols corresponding to the RFID readers; a controller that generates and cancels communication channels for each RFID reader protocol corresponding to the RFID readers; and a message processor that stores the setting messages and the control messages or transmits them to the RFID readers through the communication channel according to a set order.

Another embodiment of the present invention provides an interlocking method for an RFID reader in an RFID (Radio Frequency Identification) reader controlling device, including: receiving setting messages for interlocking for an RFID reader from application devices providing services; forming a first communication channel with the RFID reader on the basis of a first RFID reader protocol included in reader connection information corresponding to the setting messages; forming a second communication channel with the RFID reader on the basis of a second RFID reader protocol included in reader connection information corresponding to the setting messages; and informing the application devices that the interlocking for the RFID readers is set if the first and second communication channels are connected with the RFID reader.

Further, yet another embodiment of the present invention provides an RFID reader controlling method based on a plurality of RFID (Radio Frequency Identification) reader protocols, including:

receiving control instructions for controlling the RFID readers from application devices providing services; confirming RFID reader protocol types corresponding to the control instructions; confirming whether communication channels corresponding to the RFID reader protocols are generated; transmitting the control instructions to the RFID readers through the communication channels; and transmitting control results of the RFID readers corresponding to the control instructions to the applications.

With the exemplary embodiments of the present invention, the RFID readers can be controlled according to the RFID reader protocols.

Further, with the exemplary embodiments of the present invention, the RFID readers can be controlled to meet the purposes of application services in an application environment that compositely uses the RFID readers.

BRIEF DESCRIPTION OF THE DRAWINGS

FIG. 4 is a flowchart showing an RFID reader controlling method according to an embodiment of the present invention.

DETAILED DESCRIPTION OF THE EMBODIMENTS

Figure 1:
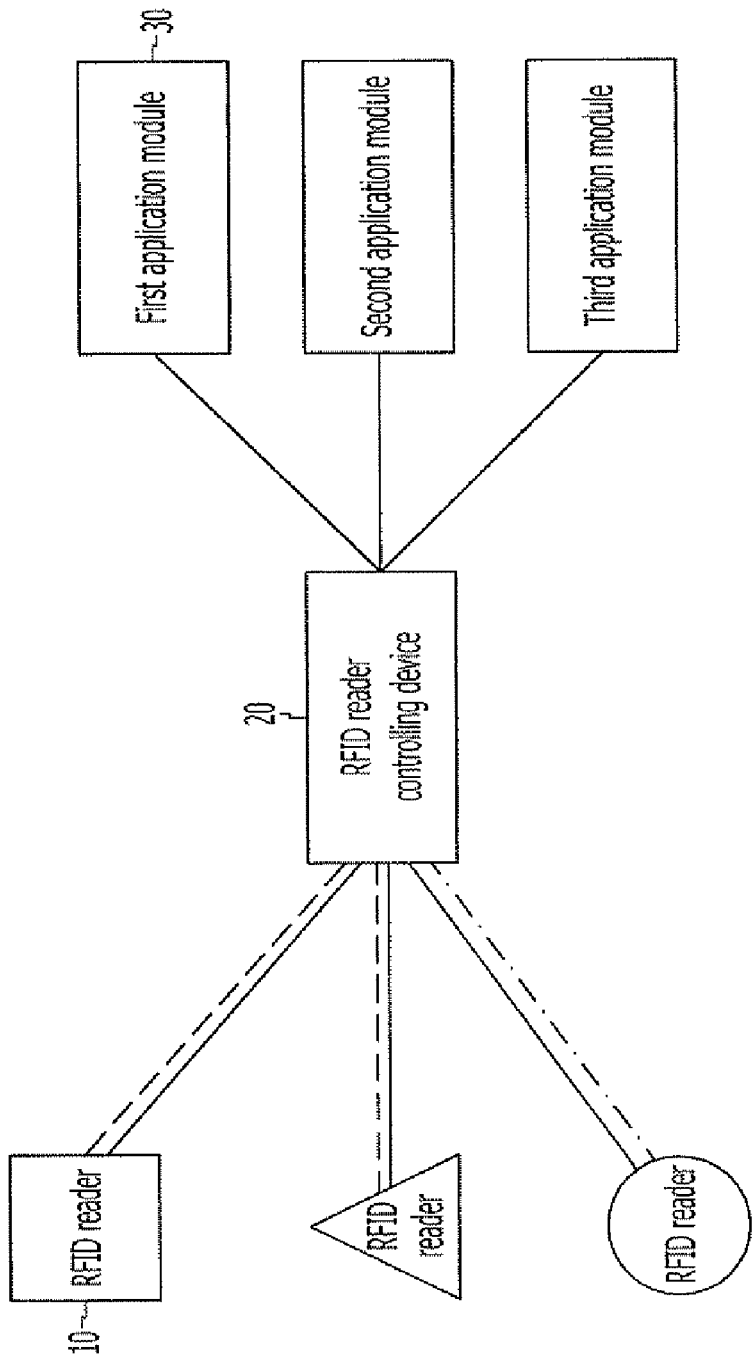
FIG. 1 is a diagram schematically showing an environment where an RFID reader controlling device according to an exemplary embodiment of the present invention is applied.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the whole specification, unless explicitly described to the contrary, the word "comprise" and variations such as "comprises" or "comprising" will be understood to imply the inclusion of stated elements but not the exclusion of any other elements.

Hereinafter, an RFID reader controlling device, an interlocking method for an RFID reader, and an RFID reader controlling method according to an exemplary embodiment of the present invention will be described in detail with reference to the accompanying drawings.

FIG. 1 is a diagram schematically showing an environment where an RFID reader controlling device according to an exemplary embodiment of the present invention is applied.

Referring to FIG. 1, an RFID reader controlling environment according to one embodiment of the present invention includes a plurality of RFID readers 10, an RFID reader controlling device (Multiple RFID Reader Protocol Controller (MRRPC)) 20, and an application device 30 that processes a plurality of application services.

Each RFID reader 10 recognizes RFID tags existing in each recognition range and supports a plurality of RFID reader protocols.

The RFID reader controlling device 20 controls each RFID reader 10 on the basis of a plurality of RFID reader protocols, and provides services provided by each application device 30 to each RFID reader 10.

The plurality of RFID reader protocols includes ISO/IEC 15961 (ISO15961), EPCglobal Reader Protocol (RP), EPCglobal Reader Management (RM), and EPCglobal Low Level Reader Protocol (LLRP).

Each RFID reader protocol includes different control functions as indicated in the following Table 1 for each standard in question.

For example, the ISO15961 protocol is used to collect and change data of RFID tags.

Further, the RM protocol can be used to confirm the operation states and execute job statistics of the RFID readers, such that it should be able to perform control functions corresponding to each protocol through one RFID reader and two simultaneous RFID reader protocols.

TABLE 1

| Characteristic | ISO15961 | RP | RM | LLRP |
| --- | --- | --- | --- | --- |
| Standardization organization | ISO/IEC JTC 1 | EPCglobal | EPCglobal | EPCglobal |
| Support asynchronous report or not | infeasible | feasible | feasible | feasible |
| Monitor reader operating state or not | infeasible | infeasible | feasible | feasible |
| Support repetitive control peformance or not | impossible (perform one-time instruction) | infeasible (however, generation of asynchronous message is feasible) | infeasible (however, generation of asynchronous message is feasible) | feasible |
| Read/write RFID tag data | feasible | feasible | infeasible | feasible |
| Kill RFID tag operation | infeasible | feasible | infeasible | feasible |
| Lock RFID tag data | feasible | infeasible | infeasible | feasible |
| Message format | without limitation | XML, Text | XML, SNMP | Binary |
| Communication scheme | without limitation | Serial, TCP, HTTP | Serial, TCP, UDP | TCP |
| Support RFID frequency bandwidth | HF, UHF (however, extensible) | UHF | UHF | UHF (however, extensible) |

The RFID reader controlling device 20 transmits and receives control messages for the RFID readers to/from each RFID reader 10 and each application device 30 through communication schemes, such as transmission control protocol (TCP), user datagram protocol (UDP), hypertext transfer protocol (HTTP), Bluetooth, wireless digital pulse or ultra wide band (UWB), etc.

Each application device 30 controls the plurality of RFID readers 10 using the RFID reader controlling device 20 to perform jobs in a unified manner.

In detail, a plurality of application devices 30 include a first application module, a second application module, and a third application module.

Herein, the first application module collects data of RFID tags recognized by each RFID reader by using the plurality of RFID readers 10.

The second application module monitors a state of the first RFID reader and the second RFID reader among the plurality of RFID readers 10, and the third application module records data in the RFID tags within the recognition area of the third RFID reader.

Herein, the first, second, and third readers according to an exemplary embodiment of the present invention are specific readers that selectively support the plurality of corresponding RFID reader protocols or support only some of the plurality of corresponding RFID reader protocols.

The services provided by the application devices using the RFID readers according to an exemplary embodiment of the present invention may be built for various purposes from data collection for articles to which the RFID tags are attached to operation state management of the RFID readers.

Further, the RFID reader controlling device 20 controls the RFID readers through multiple RFID reader protocols, such that it can simultaneously receive services provided by the plurality of applications.

Next, the structure of the RFID reader controlling device 20 will be described in detail with reference to FIG. 2.

Figure 2:
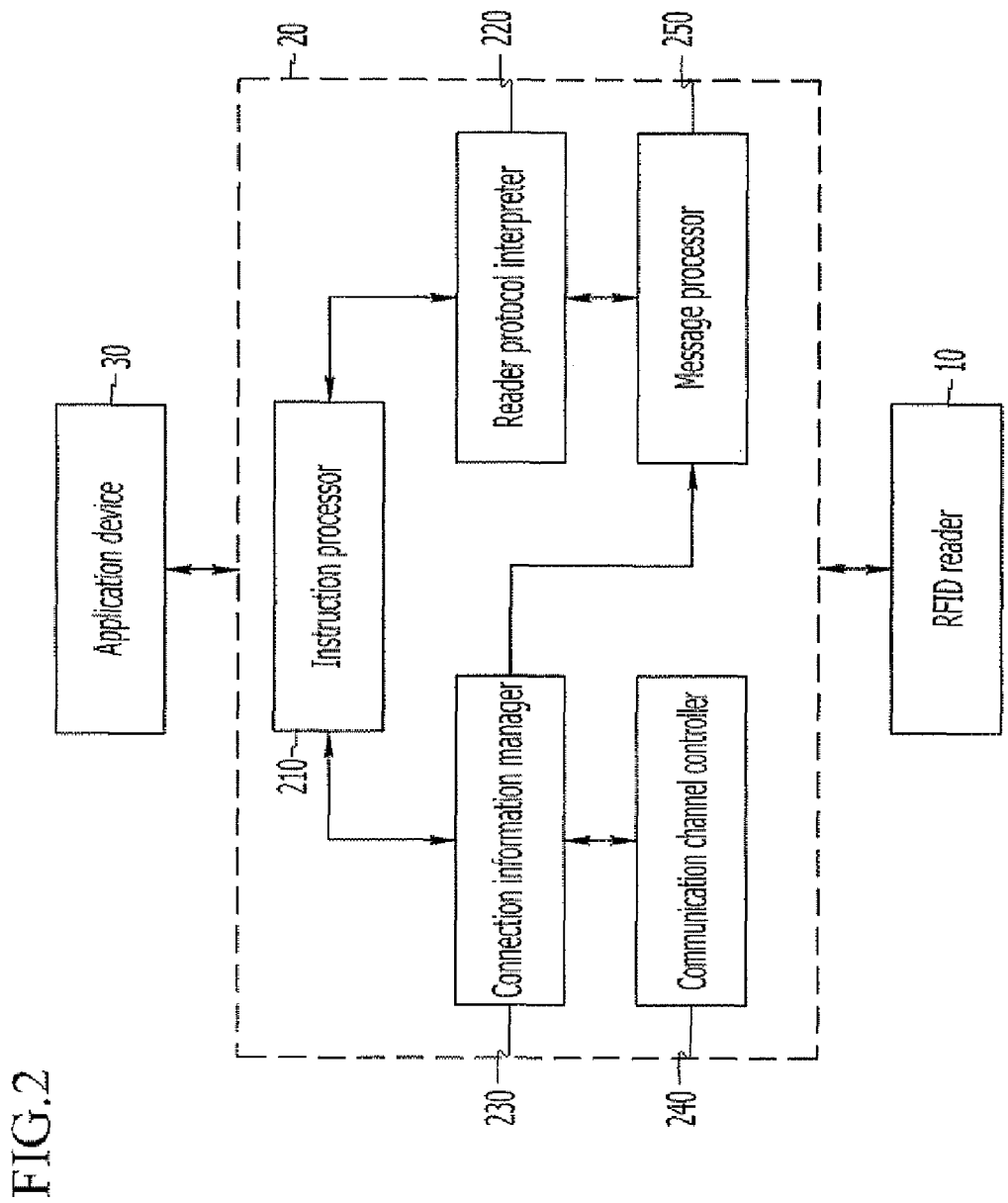
FIG. 2 is a block diagram showing a structure of an RFID reader controlling device according to an embodiment of the present invention.

FIG. 2 is a block diagram showing a structure of an RFID reader controlling device according to an embodiment of the present invention.

Referring to FIG. 2, the RFID reader controlling device 20 includes an instruction processor 210, a reader protocol interpreter 220, a connection information manager 230, a communication channel controller 240, and a message processor 250.

The instruction processor 210 processes predetermined messages that set interlocking for each REID reader 10 and control messages for each RFID reader 10.

The reader protocol interpreter 220 encodes or decodes the setting and control messages input from the instruction processor 210 on the basis of the specific RFID reader protocols.

The connection information manager 230 manages information on network addresses and communication channels corresponding to each RFID reader 10, information on message identifiers for each RFID reader protocol, etc.

The communication channel controller 240 generates and cancels the communication channels for each RFID reader protocol corresponding to each RFID reader 10, and manages the transmission and reception of predetermined messages carried on the communication channels.

The message processor 250 stores the control instruction, response, and asynchronous report messages and transmits them to each RFID reader 10 through the communication channels in a predetermined order.

Next, an interlocking method for the RFID readers 10 by setting the communication channels for the RFID reader protocols will be described in detail with reference to FIG. 3.

Figure 3:
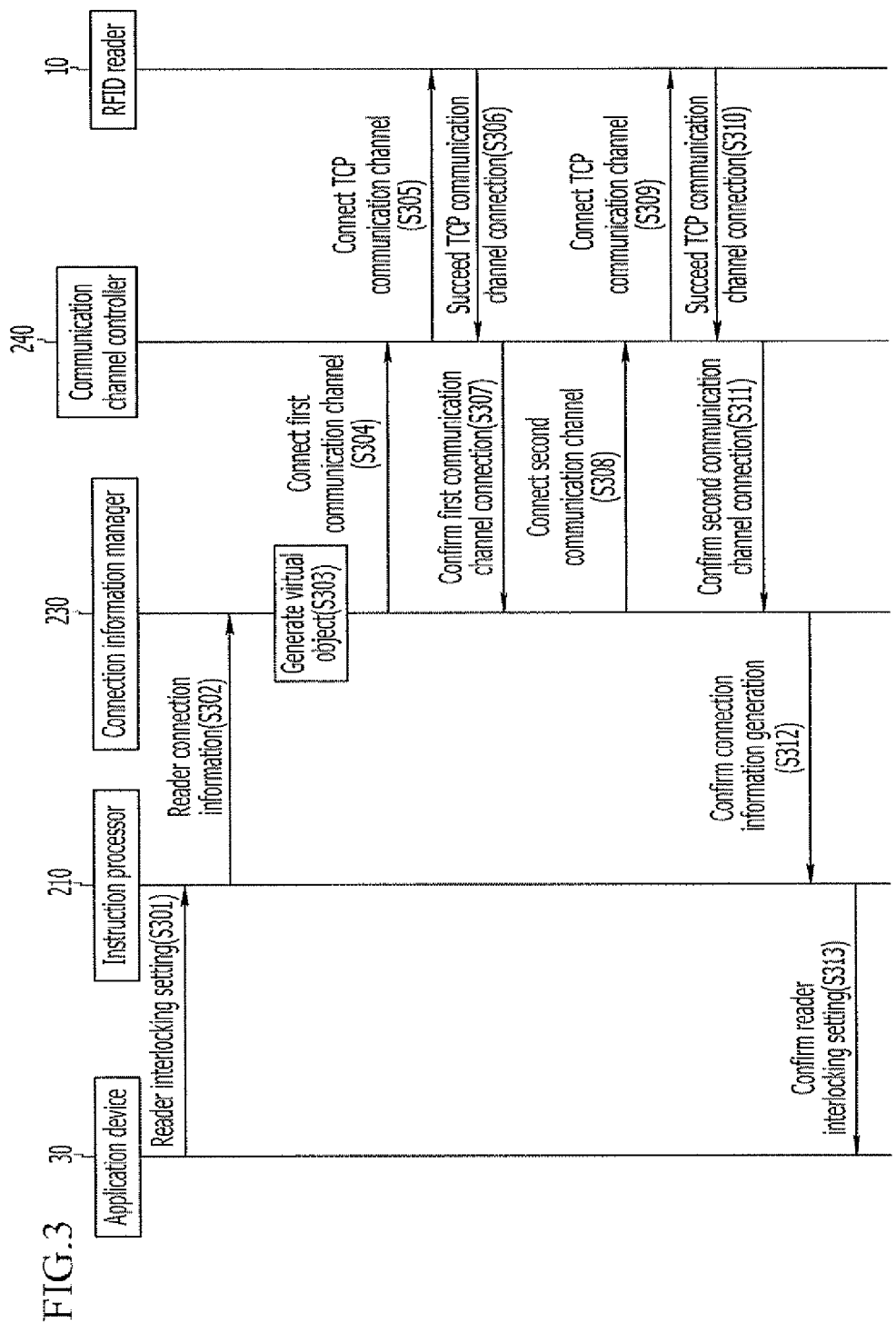
FIG. 3 is a flowchart showing an interlocking method for an RFID reader by setting communication channels for RFID reader protocols according to an exemplary embodiment of the present invention.

FIG. 3 is a flowchart showing an interlocking method for an RFID reader by setting communication channels for RFID reader protocols according to an exemplary embodiment of the present invention.

Referring to FIG. 3, the application device 30 transmits the reader interlocking setting messages to the instruction processor 210 in order to set the interlocking for the RFID readers (S301).

The instruction processor 210 transmits the reader connection information corresponding to the reader interlocking setting messages to the connection information manager 230 (S302).

At this time, the reader connection information includes any one of unique identifiers (for example, "reader0001") for the corresponding RFID readers, IP addresses (for example, "192.168.1.1"), RFID reader protocol types/communication schemes/port numbers for each RFID reader protocol (for example, "(RP, TCP, 4084), (RM, TCP, 4085), (LLRP, TCP, 5084)") supported by the RFID readers.

The connection information manager 230 generates virtual objects corresponding to the REID readers in question on the basis of the received reader connection information and stores the reader connection information (S303).

Next, the connection information manager 230 requests the communication channel connection from the communication channel controller 240 in order to connect the RFID readers 10 on the basis of the RFID reader protocol types included in the reader connection information transmitted.

For example, the connection information manager 230 requests the communication channel connection while transmitting the communication schemes/port numbers for each RFID reader protocol to the communication channel controller 240, when it is confirmed that the RFID reader 10 supports two RFID reader protocols RP and LLRP according to the reader connection information.

The communication channel controller 240 connects the communication channels with the predetermined RFID readers according to the request of the connection information manager 230.

For example, the RFID readers 10 are connected with the communication channels on the basis of the communication schemes and port numbers for each RFID reader protocol transmitted from the connection information manager 230.

At this time, the initial connection mechanism of each message communication channel observes standards defined in each RFID reader protocol.

Reviewing the communication channel connection process in detail, when the RFID reader protocol types are RP and LLRP, the connection information manager 230 transmits the first communication channel connecting request messages to the communication channel controller 240 in order to connect the RFID readers 10 with the communication channels on the basis of the RP (S304).

The communication channel controller 240 transmits the TCP communication channel connecting request to the RFID readers 10 on the basis of the TCP communication scheme corresponding to the first communication channel connecting request messages received (S305).

The RFID reader 10 performs the connection with the first communication channel in the TCP communication channel connecting scheme to perform the RP, and informs the communication channel controller 240 that the connection has succeeded (S306).

The communication channel controller 240 transmits the information on the first communication channel to the connection information manager 230 (S307).

The connection information manager 230 transmits the second communication channel connecting request messages to the communication channel controller 240 in order to connect the RFID reader 10 with the second communication channel on the basis of the LLRP (S308).

The communication channel controller 240 transmits the TCP communication channel connecting request to the RFID readers 10 on the basis of the TCP communication scheme corresponding to the second communication channel connecting request messages received (S309).

The RFID reader 10 performs the connection with the communication channel in the TCP communication channel connecting scheme to perform the LLRP, and informs the communication channel controller 240 that the connection has succeeded (S310).

At this time, the TCP communication channel connecting scheme to perform the LLRP and the TCP communication channel connecting scheme to perform the RP may be different from each other.

The communication channel controller 240 transmits the information on the second communication channel to the connection information manager 230 (S311).

The connection information manager 230 receives the information on the first and second communication channels, and transmits the connection generating acknowledge messages to the instruction processor 210 in order to inform that the connection information generating process of the RFID reader 10 is terminated (S312).

The instruction processor 210 transmits the interlocking setting acknowledge messages for the readers to the application device 30 in order to inform that the connection information generating process is terminated and the RFID readers are interconnected (S313).

Next, a method of controlling the specific RFID readers 10 on the basis of the RFID reader protocols will be described in detail with reference to FIG. 4.

FIG. 4 is a flowchart showing an RFID reader controlling method according to an embodiment of the present invention Referring to FIG. 4, the application device 30 sends the reader control instructions for controlling the RFID readers to the instruction processor 210 (S401).

At this time, the control instructions include data such as the unique identifiers, the control instruction messages, and the control parameters for the RFID readers 10, and are represented as follows.

Further, among the RFID tags within the recognition area of the RFID reader having the unique identifier reader0001, the RFID tag of which the tag ID (tagId) is 101010FF is recognized, and the control instructions that read in all the data is schematically represented.

The unique identifiers for the RFID readers (for example, "reader0001")
The control instruction messages (e.g., "RP_Source_Read")
The control parameter (e.g., "data=All, passwords=11110000, tagId=101010FF")

The instruction processor 210 analyzes the reader control instructions to confirm whether they are control instructions for any type of RFID reader protocols.

As the confirmation result, when the control instructions are the RP-based reader control instructions, the instruction processor 210 sends the RF-based reader control instructions to the reader protocol interpreter 220 (S402).

The reader protocol interpreter 220 encodes the control instruction messages and the control parameters to meet the RFID reader protocol standards corresponding to the reader control instruction in question.

Further, the reader protocol interpreter 220 asks the connection information manager 230 to inquire about the message identifiers for each RFID reader protocol in question and the information on the communication channels corresponding to the RFID reader protocols in question (S403).

The connection information manager 230 transmits an inquiry about the information on the communication channels corresponding to the RFID reader protocols in question to the communication channel controller 240 (S404).

The communication channel controller 240 determines whether the communication channels corresponding to the RFID reader protocols are generated, and when the communication channels are generated, transmits the information on the corresponding communication channels to the connection information manager 230 (S405).

The connection information manager 230 transmits the message identifiers for each RFID reader protocol corresponding to the RFID readers 10 and the information on the communication channels transmitted to the reader protocol interpreter 220 (S406).

For example, the connection information manager 230 transmits socket information of the RP communication channel corresponding to the RFID reader having reader0001 and the RF instruction message identifier to the reader protocol interpreter 220.

At this time, the message identifiers are used to uniquely discriminate messages transmitted and received to and from the RFID reader, such that they should be sequentially provided and not overlapped with each other.

Further, the connection information manager 230 requests the information on the communication channel from the communication channel controller 240 in order to confirm the connection state of the corresponding communication channel.

The reader protocol interpreter 220 converts the previously input RF-based reader control instructions to correspond to the specific RFID reader protocols and transmits them to the message processor 250 (S407).

The message processor 250 transmits the instruction message corresponding to the RP-based reader control instructions converted through the previously inquired communication channel to the RFID reader 10 (S408), and receives a response message from the RFID reader 10 (S409).

Also, when the response message to the transmitted instruction message is received, the message processor 250 transmits the RP-based reader control response data to the reader protocol interpreter 220 (S410).

The reader protocol interpreter 220 decodes the transmitted RF-based reader control response data and transmits the decoded response data, that is, the control instruction response message, to the instruction processor 210 (S411).

Next, the instruction processor 210 transmits the reader control result corresponding to the control instruction response message to the application device 30 calling for the reader control instructions (S412).

In the above description, the flow where the RFID reader 10 transmits the synchronous response corresponding to the reader control instruction called for from the application device 30 was described.

Meanwhile, the REID readers 10 may asynchronously generate the data of the identified RFID tags and transmit them to the application devices 30.

In this case, the RFID reader 10 transmits the asynchronous report messages including the data of the identified RFID tags to the message processor 250 (S413).

The message processor 250 transmits the RP-based reader asynchronous data to the protocol interpreter 220 (S414).

The reader protocol interpreter 220 transmits the reader report data corresponding to the transmitted RF-based reader asynchronous data to the application devices 30 (S415).

As described above the message flow controlling the RFID readers 10 according to the exemplary embodiment of the present invention can be used to allow the application devices 30 to directly provide the setting or instructions to the RFID readers 10 and to immediately obtain the response thereto, while the asynchronous message flow can be used to autonomously transmit the data collected in the RFID reader 10 or the operation states of the RFID readers to the application devices 30 at every specific point in time.

The above-mentioned exemplary embodiments of the present invention are not embodied only by a method and apparatus. Alternatively, the above-mentioned exemplary embodiments may be embodied by a program performing functions that correspond to the configuration of the exemplary embodiments of the present invention, or a recording medium on which the program is recorded. These embodiments can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary is intended to cover various modifications and equivalent arrangements included within the spirit and scope of the appended claims.

What is claimed is:

1. An RFID reader controlling device controlling RFID readers on the basis of a plurality of RFID (Radio Frequency Identification) reader protocols to provide services provided by each application device to RFID readers, comprising:
    an instruction processor that performs instructions according to setting messages and control messages to interlock with the RFID readers from the application devices providing the services;
    an interpreter that converts the setting messages and the control messages on the basis of the RFID reader protocols corresponding to the RFID readers;
    a controller that generates and cancels communication channels for each RFID reader protocol corresponding to the RFID readers; and
    a message processor that stores the setting messages and the control messages or transmits the setting messages and the control messages to the RFID readers through the communication channel according to a predetermined order.

2. The RFID reader controlling device of claim 1, further comprising:
    a connection information manager that manages reader connection information including RFID reader protocol types supported by the RFID readers and communication channels for each RFID reader protocol.

3. The RFID reader controlling device of claim 1, wherein:
    it controls the RFID readers and provides services provided by the application devices to the RFID readers by using one communication scheme of transmission control protocol, user datagram protocol, hypertext transmission protocol, Bluetooth, and ultrawideband.

4. An interlocking method for an RFID reader in an RFID (Radio Frequency Identification) reader controlling device, comprising:
    receiving setting messages for interlocking for an RFID reader from application devices providing services;
    forming a first communication channel with the RFID reader on the basis of a first RFID reader protocol included in reader connection information corresponding to the setting messages;
    forming a second communication channel with the RFID reader on the basis of a second RFID reader protocol included in reader connection information corresponding to the setting messages; and
    informing the application devices that the interlocking for the RFID readers is set if the first and second communication channels are connected with the RFID reader.

5. The interlocking method for an RFID reader of claim 4, wherein
    the reader connection information includes unique identifiers, IP addresses, RFID reader protocol types supported by the RFID readers, and communication schemes/port numbers for each RFID reader protocol.

6. The interlocking method for an RFID reader of claim 4, wherein the forming the first communication channel includes forming the first communication channel with the RFID reader in a first communication scheme to perform the first RFID reader protocol.

7. The interlocking method for an RFID reader of claim 4, wherein the forming the second communication channel includes connecting the RFID readers in a second communication scheme to perform the second RFID reader protocol.

8. An RFID reader controlling method based on a plurality of RFID (Radio Frequency Identification) reader protocols, comprising;
    receiving control instructions for controlling RFID readers from application devices providing services
    confirming RFID reader protocol types corresponding to the control instructions;
    confirming whether communication channels corresponding to the RFID reader protocols are generated;
    transmitting the control instructions to the RFID readers through the communication channels; and
    transmitting control results of the RFID readers corresponding to the control instructions to the applications.

9. The RFID reader controlling method of claim 8, further comprising:
    receiving asynchronous report messages including data of RFID tags identified by the RFID readers; and
    transmitting the asynchronous report messages to the applications on the basis of the RFID reader protocols.

10. The RFID reader controlling method of claim 8, wherein
    the control instructions include unique identifiers for the RFID readers, control instructions, and control parameters, and
    the receiving the control instructions comprises
    encoding the control instruction messages and the control parameters corresponding to the RFID reader protocols.

* * * * *